(12) United States Patent
Kimoto (10) Patent No.: US 6,505,604 B2
(45) Date of Patent: Jan. 14, 2003

(54) IGNITION TIMING CONTROL APPARATUS FOR INTERNAL COMBUSTION ENGINE

(75) Inventor: Yasuhiro Kimoto, Hyogo-ken (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/935,572

(22) Filed: Aug. 24, 2001

(65) Prior Publication Data

US 2002/0117147 A1 Aug. 29, 2002

(30) Foreign Application Priority Data

Feb. 23, 2001 (JP) ........................................ 2001-048363

(51) Int. Cl.$^7$ ................................................ F02B 31/00
(52) U.S. Cl. .................................... 123/306; 123/406.11
(58) Field of Search ............................. 123/306, 406.11, 123/307, 308, 309, 406.12

(56) References Cited

U.S. PATENT DOCUMENTS

| 4,725,955 A | * | 2/1988 | Kobayashi et al. | ......... 123/306 |
| 5,887,568 A | * | 3/1999 | Takeyama et al. | .......... 123/306 |
| 6,286,478 B1 | * | 9/2001 | Atago et al. | ................. 123/306 |

FOREIGN PATENT DOCUMENTS

| JP | 62-253961 | 11/1987 | ............. F02P/5/15 |
| JP | 7-42916 | 5/1995 | ............. F02P/5/15 |

* cited by examiner

*Primary Examiner*—Bibhu Mohanty
(74) *Attorney, Agent, or Firm*—Sughrue Mion, PLLC

(57) ABSTRACT

An ignition timing control apparatus for an internal combustion engine is provided which is capable of preventing the generation of knocking immediately after an intake air control valve is driven to operate. An intake air control valve (23) is provided in an intake passage (5) of an engine (1). A swirl control element (10) controls the opening and closing of the intake air control valve in accordance with operating conditions of the engine thereby to adjust a magnitude of an intake air swirl. An ignition timing calculating element (10) determines ignition timing of the engine through interpolation using ignition timing map data corresponding to the number of revolutions per unit time of the engine and an engine load. A map data setting element (10) switches and sets the ignition timing map data in accordance with opening and closing of the intake air control valve (23). An ignition timing retarding element (10) corrects the ignition timing by a prescribed retarded angle amount over a first predetermined period after a switching of the ignition timing map data.

4 Claims, 6 Drawing Sheets

IGNITION TIMING CONTROL APPARATUS FOR INTERNAL COMBUSTION ENGINE

This application is based on Application No. 2001-48363, filed in Japan on Feb. 23, 2001, the contents of which are hereby incorporated by reference.

BACKGROUND OF THE INVENTION

1. Field of the Invention

The present invention relates to an ignition timing control apparatus for an internal combustion engine provided with a swirl control element for adjusting the magnitude or momentum of an intake air swirl according to engine operating conditions, and more particularly, it relates to such an ignition timing control apparatus for an internal combustion engine capable of preventing knocks from occurring immediately after an intake air control valve is driven to operate.

2. Description of the Related Art

In the past, it has been proposed that in an ignition timing control apparatus for an internal combustion engine, provision is made for a swirl control element for adjusting the magnitude or momentum of an intake air swirl in accordance with the operating conditions of the engine.

Such a kind of ignition timing control apparatus for an internal combustion engine is described in Japanese Patent Publication No.7-42916, for example. The apparatus disclosed therein sets ignition timing in accordance with the engine operating conditions including the operating state of an intake air control valve.

In addition, there has also been known another apparatus in which ignition timing data for an open state and a closed state, respectively, of an intake air control valve are set in advance so that they are switched over in accordance with the operating state of the intake air control valve.

In general, in an internal combustion engine equipped with a low-load intake air passage and a high-load intake air passage, the low-load intake air passage and the high-load intake air passage are switched from their open state to their closed state or vice versa in accordance with the engine operating conditions.

That is, when the engine is operating under a low load, the high-load intake air passage is closed to increase the magnitude or momentum of a swirl of intake air, thereby improving combustion efficiency and fuel economy, whereas when the engine is operating under a high load, the high-load intake air passage is opened to decrease intake air resistance, thus providing high power.

At this time, the burning rate of an air fuel mixture is higher when the momentum of the intake air swirl is strong than when the momentum of the intake air swirl is weak, and hence it is necessary to retard the ignition timing at a high burning rate. Accordingly, there has been proposed an apparatus which is capable of switching the settings of ignition timing corresponding to the opening and closing of an intake air control valve, as described above.

Figure 5:
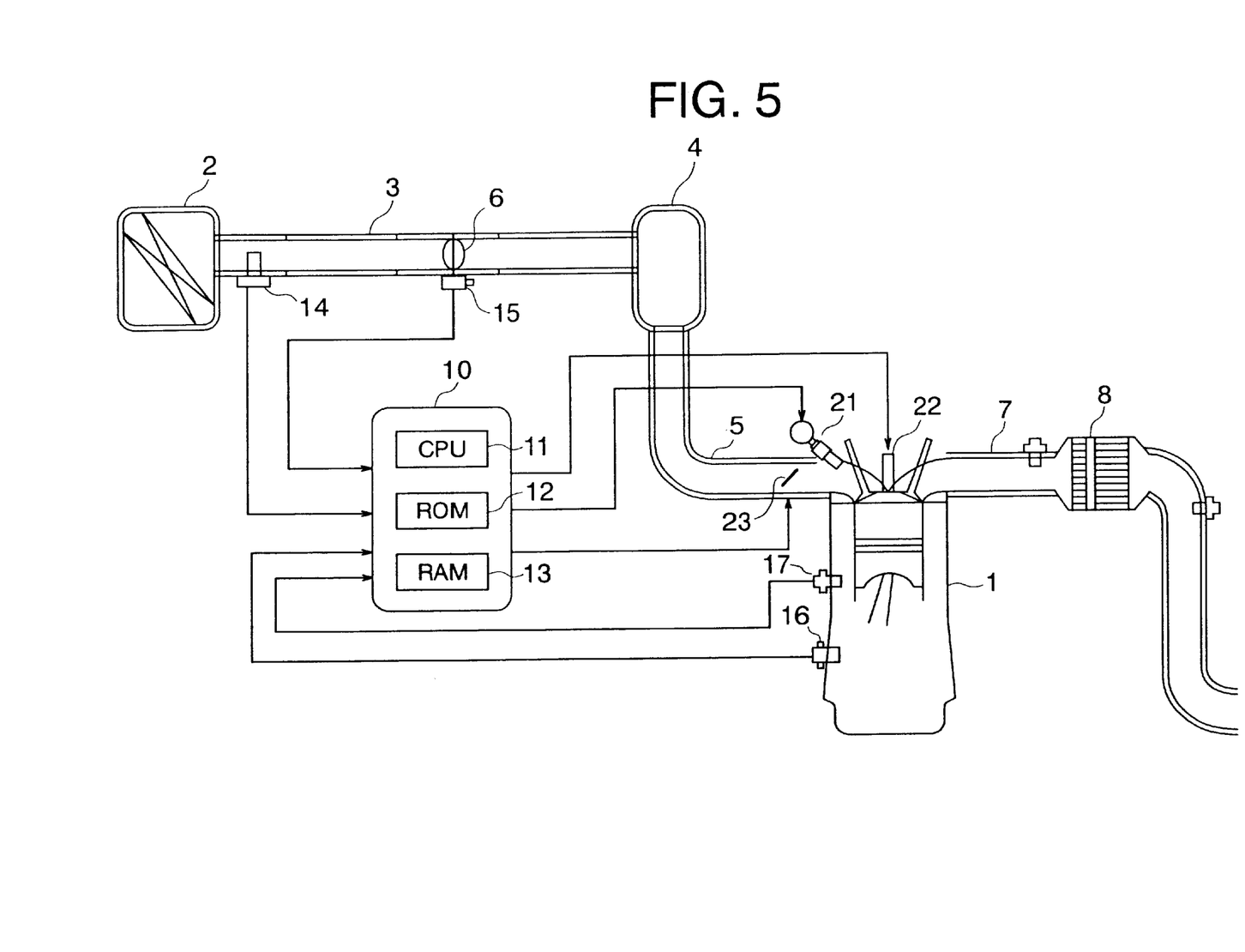
FIG. 5 is a block diagram illustrating the construction of a common ignition timing control apparatus for an internal combustion engine.

FIG. 5 is a block diagram illustrating a common ignition timing control apparatus for an internal combustion engine, which is applied to an automotive engine control apparatus for example. In FIG. 5, an intake pipe 3 with an air cleaner 2 attached at one end thereof is connected at the other end thereof with an internal combustion engine (hereinafter simply referred to as "engine") 1 through a surge tank 4 and an intake manifold 5, so that air is sucked into the engine 1 through the air cleaner 2, the intake pipe 3, the surge tank 4 and the intake manifold 5.

Mounted on the intake pipe 3 is a throttle valve 6 which is associated with an unillustrated accelerator pedal or lever so that the throttle valve 6 is operated by or in synchronization with the accelerator pedal or lever.

An exhaust pipe 7 is connected at its one end with the engine 1, and a catalytic converter 8 is inserted in the exhaust pipe 7 for purifying exhaust gases discharged from the engine 1. Thus, the exhaust gases generated by combustion of an air fuel mixture in the engine 1 are purified by the catalytic converter 7 and discharged to the ambient atmosphere through the exhaust pipe 6.

An electronic control unit (hereinafter simply referred to as "ECU") 10, which constitutes an engine controller proper for the engine control apparatus, is comprised of a microcomputer including a CPU 11, a ROM 12, a RAM 13, etc., for controlling and driving a variety of actuators based on various sensor information representative of the operating conditions of the engine 1.

An airflow sensor 17 and a throttle opening sensor 15 are mounted on the intake pipe 3. The airflow sensor 14 measures the amount or flow rate of intake air flowing in the intake pipe 3 and generates a corresponding output signal to the ECU 10. The throttle opening sensor 15 measures the opening of the throttle valve 15 and generates a corresponding output signal to the ECU 10.

The engine 1 is provided with a crank angle sensor 16 and a water temperature sensor 17. The crank angle sensor 16 detects the crank angle or rotational position of an unillustrated crankshaft of the engine 1 and hence the number of revolutions per unit time of the engine 1, and generates a corresponding output signal to the ECU 10. The water temperature sensor 17 detects the temperature of engine cooling water or coolant and generates a corresponding output signal to the ECU 10.

Also, the engine 1 is further provided with an injector 21 for injecting fuel into each engine cylinder, and an ignition plug 22 for electrically igniting the fuel in each engine cylinder. In addition, an intake air control valve 23 is provided in the intake manifold 5 for adjusting the magnitude or momentum of a swirl of intake air sucked into the engine 1.

The CPU 11 in the ECU 10 performs various calculations or operational processing based on the various signals input to the ECU 10 while using control programs stored in the ROM13, determines the operating conditions of the engine 1, and calculates optimal control parameters for various actuators in accordance with the engine operating conditions thus determined.

That is, the ECU 10 controls the valve opening time of the injector 21 so that an optimal amount of fuel is supplied to the engine 1 in accordance with the engine operating conditions. At the same time, the ECU 10 also controls the energization time of an ignition coil so as to provide the ignition plug 22 with optimal ignition timing, and it additionally controls the opening and closing condition of the intake air control valve 23 so as to properly adjust the magnitude or momentum of an intake air swirl.

Figure 6:
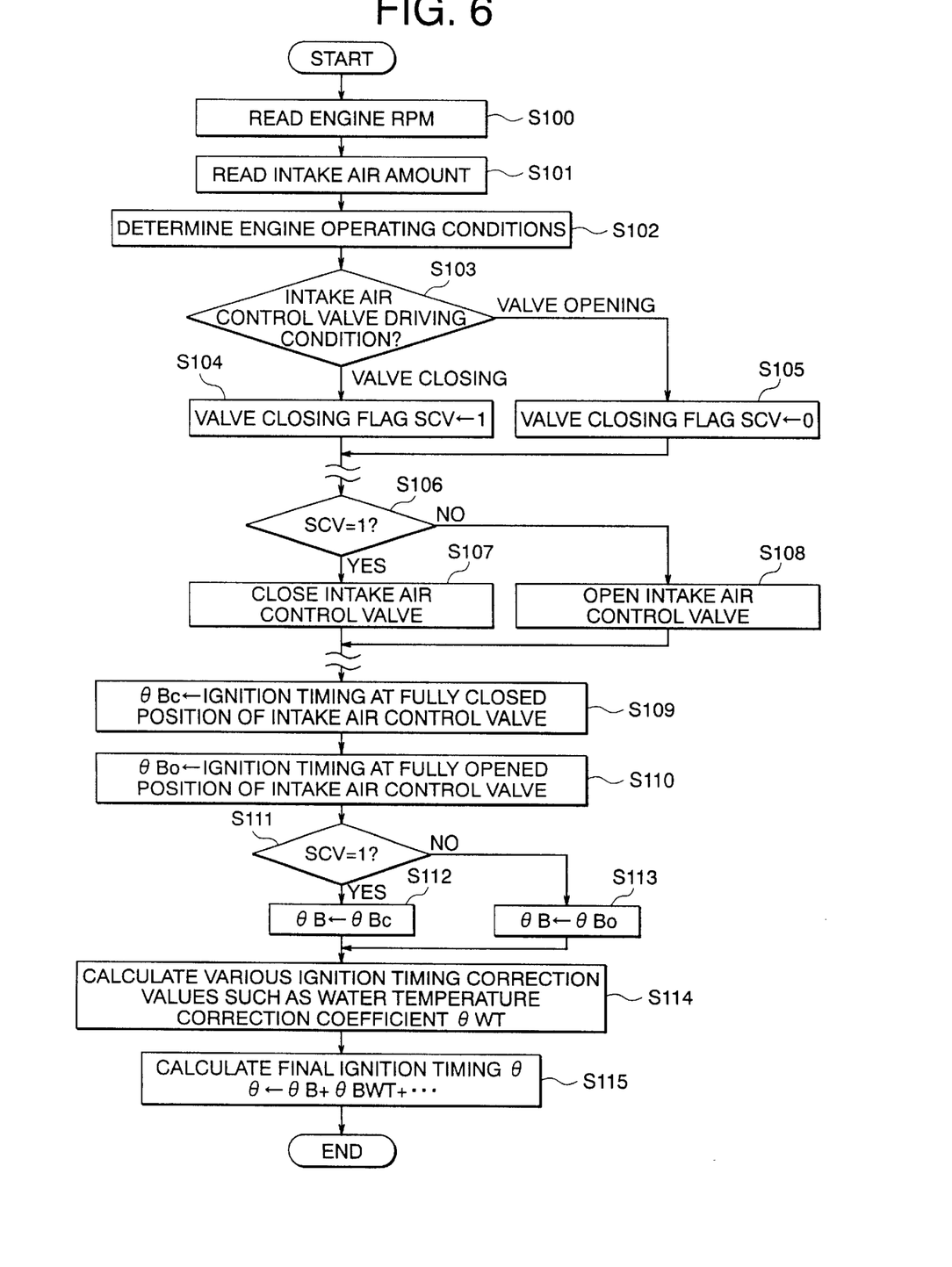
FIG. 6 a flow chart illustrating the operation of a known ignition timing control apparatus for an internal combustion engine.

Next, reference will be made to a concrete processing operation according to the known ignition timing control apparatus for an internal combustion engine shown in FIG. 5 while referring to a flow chart of FIG. 6. FIG. 6 illustrates a control sequence executed by the CPU 11 in the ECU 10.

In FIG. 6, the ECU 10 first reads the number of revolutions per unit time of the engine based on the output signal from the crank angle sensor 16 (step S100), and reads the amount of intake air sucked into the engine 1, based on the output signal from the airflow sensor 14 (step S101).

Also, the ECU 10 determines the operating conditions of the engine 1 based on the information output from other sensors (e.g., the water temperature sensor 17, etc.) in addition to the above-mentioned information input thereto (step S102).

Further, the operating condition of the intake air control valve 23 is determined based on the operating conditions of the engine 1 (step S103), and when it is determined that the intake air control valve 23 is in a closed state, a valve closing flag SCV in the RAM 13 is set to "1" (step S104), whereas when it is determined that the intake air control valve 23 is in an open state, the valve closing flag SCV in the RAM 13 is set to "0" (step S105).

Subsequently, a determination is made as to whether the valve closing flag SCV is set to "1" (step S106), and when it is determined that SCV=1 (i.e., YES), a valve closing condition is established and hence the intake air control valve 23 is driven to close (step S107).

On the other hand, when it is determined in step S106 that SCV=0 (i.e., NO), the valve closing condition is not established (i.e., a valve opening condition is established) and hence the intake air control valve 23 is driven to open (step S108).

Thereafter, an ignition timing $\theta Bc$ at the closed state of the intake air control valve 23 is stored (step S109), and an ignition timing $\theta Bo$ at the open state of the intake air control valve 23 is stored (step S110).

Then, a determination is made as to whether the valve closing flag SCV is set to "1" (step S111), and when it is determined that SCV=1 (i.e., YES), the ignition timing $\theta Bc$ at the closed state of the intake air control valve 23 is set as a basic ignition timing $\theta B$ (step S112).

On the other hand, when it is determined in step SIII that SCV=0 (i.e., NO), the ignition timing $\theta Bo$ at the open state of the intake air control valve 23 is set as the basic ignition timing $\theta B$ (step S113).

Subsequently, various correction values such as a water temperature correction factor $\theta WT$ corresponding to the temperature of engine cooling water detected by the water temperature sensor 17, etc., are calculated (step S114), and a final ignition timing $\theta$ is calculated by making various corrections including the water temperature correction factor $\theta WT$ for the basic ignition timing $\theta B$ (step S115).

Finally, the ECU 10 drives the ignition plug 22 for each engine cylinder through an unillustrated ignition coil in accordance with a driving routine (not shown) based on the final ignition timing $\theta$.

However, in the case where the ignition timing map data are switched in accordance with the opening and closing of the intake air control valve 23, as described above, adverse situations such as, for example, knocking might be caused immediately after the intake air control valve 23 is driven to switch from the closed state to the open state.

That is, even if the intake air control valve 23 is driven to switch from the closed state to the open state to diminish the momentum of the intake air swirl, the existence of a time lag in the change of the intake air swirl momentum might cause knocking when the ignition timing is changed to advance during the period of such a time lag.

Moreover, it may be considered that the ignition timing map data values corresponding to a valve-opened area in the vicinity of a valve-closed area of the intake air control valve 23 are set beforehand to an ignition timing retarded angle side so as to avoid knocking. In this case, however, the performance of the engine 1 might be deteriorated when the engine 1 is driven to run in a steady state in an operating range corresponding to the valve-opened area in the vicinity of the valve-closed area, and it might become impossible to flexibly set the opening and closing areas of the intake air control valve 23.

In the known ignition timing control apparatus for an internal combustion engine, since the ignition timing map data are switched in accordance with the opening and closing of the intake air control valve 23, there exists a time-lag period in the change of the magnitude or momentum of an intake air swirl. Therefore, there arises a problem in that knocking might occur immediately after the intake air control valve 23 is driven to switch from the closed state into the open state when the ignition timing is changed to an ignition timing advanced angle side.

In addition, there is another problem in that even if the ignition timing map data values corresponding to the valve-opened area in the vicinity of the valve-closed area of the intake air control valve 23 are set to the ignition timing retarded angle side in order to avoid knocking, engine performance in the steady state operation would be deteriorated and it would also become impossible to flexibly set the opening and closing areas of the intake air control valve 23, eventually making it impossible to put such an idea into practical use.

SUMMARY OF THE INVENTION

The present invention is intended to obviate the above-mentioned problems and has for its object to provide an ignition timing control apparatus for an internal combustion engine which is capable of preventing knocks from being generated immediately after operation of an intake air control valve.

Bearing the above object in mind, the present invention resides in an ignition timing control apparatus for an internal combustion engine, comprising: an engine operating condition detecting element for detecting operating conditions of the engine; an intake air control valve provided in an intake passage of the engine; a swirl control element for controlling the opening and closing of the intake air control valve in accordance with the engine operating conditions detected by the engine operating condition detecting element thereby to adjust a magnitude of a swirl of intake air sucked into the engine; an ignition timing calculating element for determining ignition timing of the engine through interpolation using ignition timing map data corresponding to the number of revolutions per unit time of the engine and an engine load, a map data setting element for switching and setting the ignition timing map data in accordance with opening and closing of the intake air control valve; and an ignition timing retarding element for correcting the ignition timing by a prescribed retarded angle amount over a first predetermined period after a switching of the ignition timing map data. With this construction, the engine is effectively prevented from knocking immediately after operation of the intake air control valve.

In a preferred form of the present invention, when the intake air control valve is changed from its closed state into its open state, the prescribed retarded angle amount is limited in a manner such that retarded ignition timing, which is obtained by subtracting the prescribed retarded angle amount from the ignition timing map data at an open state of the intake air control valve, becomes at an ignition timing advanced side from the ignition timing map data at a closed state of the intake air control valve. Thus, it is possible to prevent not only the generation of knocking immediately after the intake air control valve is driven to operate, but also excessive retarded correction in the ignition timing.

In another preferred form of the present invention, the prescribed retarded angle amount is periodically subtracted to zero by a constant value at intervals of a second predetermined period after a lapse of the first predetermined period. Accordingly, it is possible to suppress not only the generation of knocking but also torque shock immediately after the intake air control valve is driven to operate.

In a further preferred form of the present invention, the ignition timing control apparatus further comprising: a valve opening rate calculating element for calculating a valve opening rate of the intake air control valve; and an ignition timing interpolating element for interpolating the ignition timing map data at an open state of the intake air control valve and the ignition timing map data at a closed state of the intake air control valve in accordance with the valve opening rate when the intake air control valve takes an intermediate opening. Thus, it is possible to prevent the generation of knocking immediately after the intake air control valve is driven to operate, and it is also possible to improve controllability at the intermediate valve opening rate of the intake air control valve.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1

The schematic construction of an ignition timing control apparatus according to the present invention is substantially the same as that shown in FIG. 5, excepting part of the function of the ECU 10.

In the preset invention, the ECU 10 includes, in addition to the above-mentioned swirl control element, the ignition timing calculating element and the map data setting element, an ignition timing retarding element which functions to correct the ignition timing by a prescribed retarded angle amount over a first predetermined period after the ignition timing map data are switched.

Figure 1:
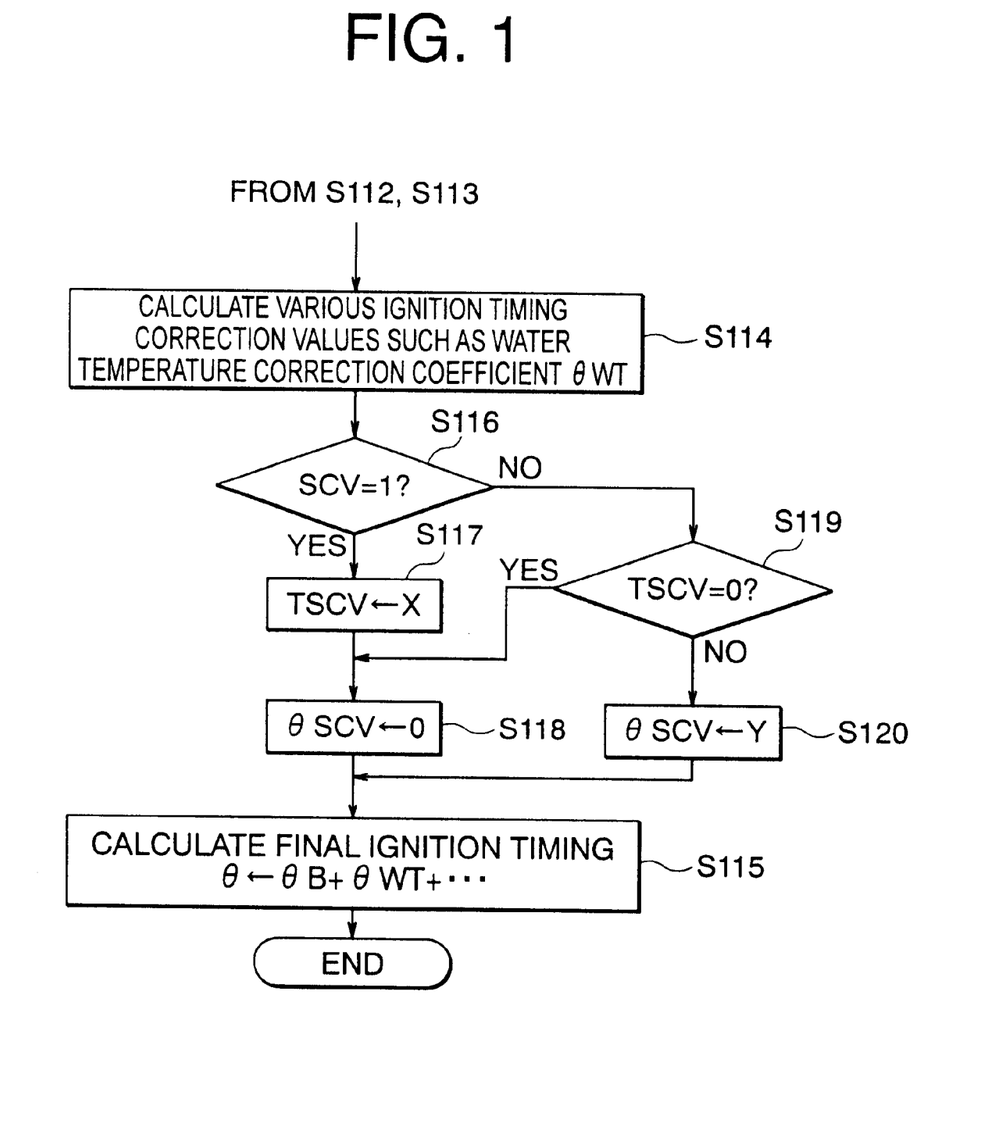
FIG. 1 is a flow chart illustrating the operation of an ignition timing control apparatus for an internal combustion engine according to a first embodiment of the present invention.

FIG. 1 is a flow chart illustrating the operation of the ignition timing control apparatus according to the first embodiment of the present invention. In FIG. 1, the same or similar processing steps in this embodiment as those in the above-mentioned flow chart of FIG. 6 are identified by the same symbols while omitting a detailed explanation thereof. Also, note that steps S100–S113 not shown in FIG. 1 are the same as those illustrated in FIG. 6.

In FIG. 1, what is different from the flow chart of FIG. 6 is that processing in steps S116–S120 is added between steps S114 and S115 of FIG. 6. First of all, subsequent to the above-mentioned various correction values calculation processing (step S114), it is determined whether the valve closing flag SCV is set to "1" (step S116).

In step S116, when it is determined that SCV=1 (i.e., YES), a timer TSCV is initially set to a first predetermined period X (hereinafter, simply referred to as "a predetermined period X")(step S117). Then, a prescribed retarded angle amount $\theta SCV$ is initially set to "0" (step s118), and a control process or routine proceeds to calculation processing for the aforementioned final ignition timing $\theta$ (step S115).

That is, when the intake air control valve 23 continues to be closed (i.e., SCV=1), the initial states (TSCV=X and $\theta SCV=0$) of the timer TSCV and the prescribed retarded angle amount $\theta SCV$ are retained.

Here, note that the timer TSCV is down counted to "0" at intervals of a predetermined period of time in an unillustrated different processing, so that at the instant when the timer TSCV comes to zero after the intake air control valve 23 is opened (i.e., SCV=0) to be released from the initial state, it can be determined that the predetermined period X has elapsed.

When it is determined as SCV=0 (i.e., NO) in step S116, then a determination is made as to whether the value of the timer TSCV reaches "0" (step S119). When it is determined as TSCV >0 (i.e., NO), a constant amount Y is set as the prescribed retarded angle amount $\theta SCV$ (step S120), and the control process proceeds to step S115.

As a result, the constant amount Y will be set as the prescribed retarded angle amount $\theta SCV$ at the time point when the valve closing flag SCV has turned from "1" into "0", i.e., at the moment when the intake air control valve 23 has been changed from the closed state into the open state.

In addition, the prescribed retarded angle amount $\theta SCV$ continues to be set to the constant amount Y until the predetermined period X elapses (i.e., TSCV=0) after the intake air control valve 23 has been changed from the closed state into the open state.

On the other hand, when it is determined as TSCV=0 (i.e., YES) in step S119, the predetermined period X has elapsed after the intake air control valve 23 had been changed from the closed state into the open state, and hence the control process proceeds to step S118 where the prescribed retarded angle amount $\theta SCV$ is zero cleared to the initial state.

Thereafter, in step S115, the basic ignition timing $\theta B$ is corrected by using the prescribed retarded angle amount $\theta SCV$ and the various correction values (e.g., water temperature correction factor $\theta WT$, etc.), thus calculating the final ignition timing $\theta$, as described before.

Here, note that the prescribed retarded angle amount $\theta SCV$ takes "0" at the initial state, and a retarded angle side corrected value when the constant amount Y is set, but the water temperature correction factor θWT for instance can be set to a corrected value either at the retarded angle side or the advanced angle side according to the temperature of engine cooling water.

In this manner, by correcting the ignition timing by the constant amount Y to the retarded angle side over the predetermined period X after the intake air control valve 23 (see FIG. 5) has been changed from the closed state to the open state, it is possible to prevent knocks from occurring immediately after the driving of the intake air control valve 23.

Embodiment 2

Although in the above-mentioned first embodiment, no particular consideration has been given to an ignition timing deviation Δθ at the time of opening and closing of the intake air control valve 23, the value of the ignition timing deviation Δθ may be set as the prescribed retarded angle amount θSCV when the prescribed retarded angle amount θSCV is greater than the ignition timing deviation Δθ.

Hereinafter, reference will be made to a second embodiment of the present invention, in which the ignition timing deviation Δθ is taken into consideration, while referring to FIG. 2.

Figure 2:
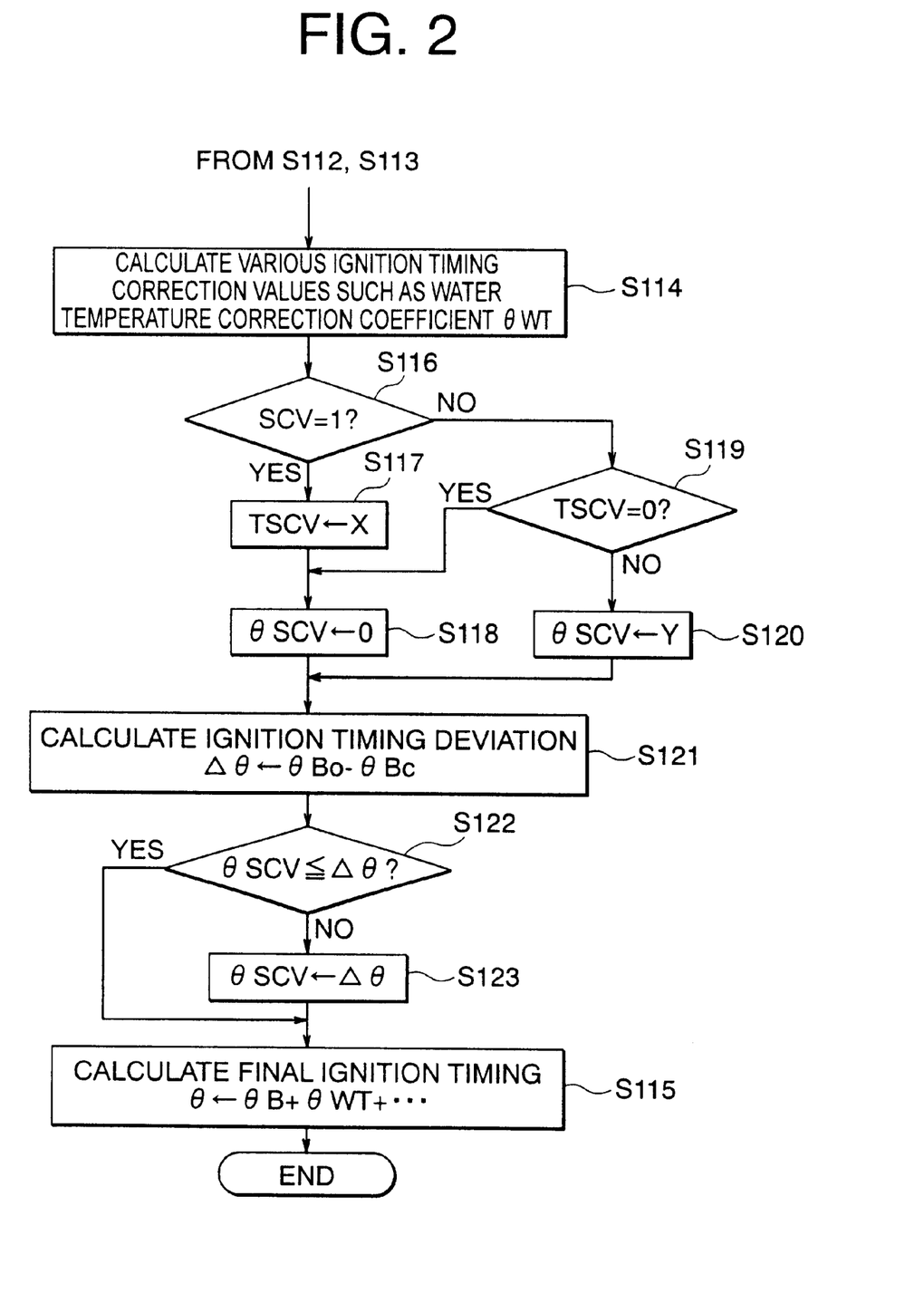
FIG. 2 is a flow chart illustrating the operation of an ignition timing control apparatus for an internal combustion engine according to a second embodiment of the present invention.

FIG. 2 is a flow chart illustrating the operation of the second embodiment of the present invention. In FIG. 2, the same or similar processing steps in this embodiment as those in the above-mentioned flow chart of FIG. 1 are identified by the same symbols while omitting a detailed explanation thereof. In FIG. 2, what is different from the flow chart of FIG. 1 is that processing in steps S121–S123 is added before steps S115.

First of all, subsequent to the setting processing of the prescribed retarded angle amount θSCV (step S118 and S120), the ignition timing deviation Δθ (=θBo−θBc) between the ignition timing θBc at the closed state and the ignition timing θBo at the open state of the intake air control valve 23 is calculated (step S121).

Then, a determination is made as to whether the prescribed retarded angle amount θSCV is equal to or less than the ignition timing deviation Δθ (step S122), and when it is determined as θSCV≦Δθ (i.e., YES), the control process directly proceeds to step S115.

On the other hand, when it is determined as θSCV >Δθ (i.e., NO) in step S122, the prescribed retarded angle amount θSCV is replaced with the value of the ignition timing deviation Δθ (step S123), and the control process proceeds to step S115.

At this time, the prescribed retarded angle amount θSCV is limited to the value of the ignition timing deviation Δθ or less. As a result, the retarded ignition timing obtained by subtracting the prescribed retarded angle amount θSCV from the ignition timing map data at the open state of the intake air control valve 23 will be set to the advanced angle side from the ignition timing map data at the closed state of the intake air control valve 23 without fail.

Thus, by limiting the set value of the prescribed retarded angle amount θSCV (ignition timing correction amount) to the value of the ignition timing deviation Δθ or less for the predetermined period X after the intake air control valve 23 is changed from the closed state into the open state, it is possible to prevent the final ignition timing θ from being corrected to the retarded angle side to an extent more than necessary even in an engine operating range in which the ignition timing deviation Δθ is limited.

Embodiment 3

Although in the above-mentioned first and second embodiments, the prescribed retarded angle amount θSCV is cleared to zero immediately when the predetermined period X has elapsed after the intake air control valve 23 had been changed from the closed state into the open state, the prescribed retarded angle amount θSCV may instead be periodically decremented to zero by a constant value at intervals of a second predetermined period.

Now, reference will be made to a third embodiment of the present invention while referring to FIG. 3. In this embodiment, the prescribed retarded angle amount θSCV is periodically subtracted by a constant value at intervals of the second predetermined period.

Figure 3:
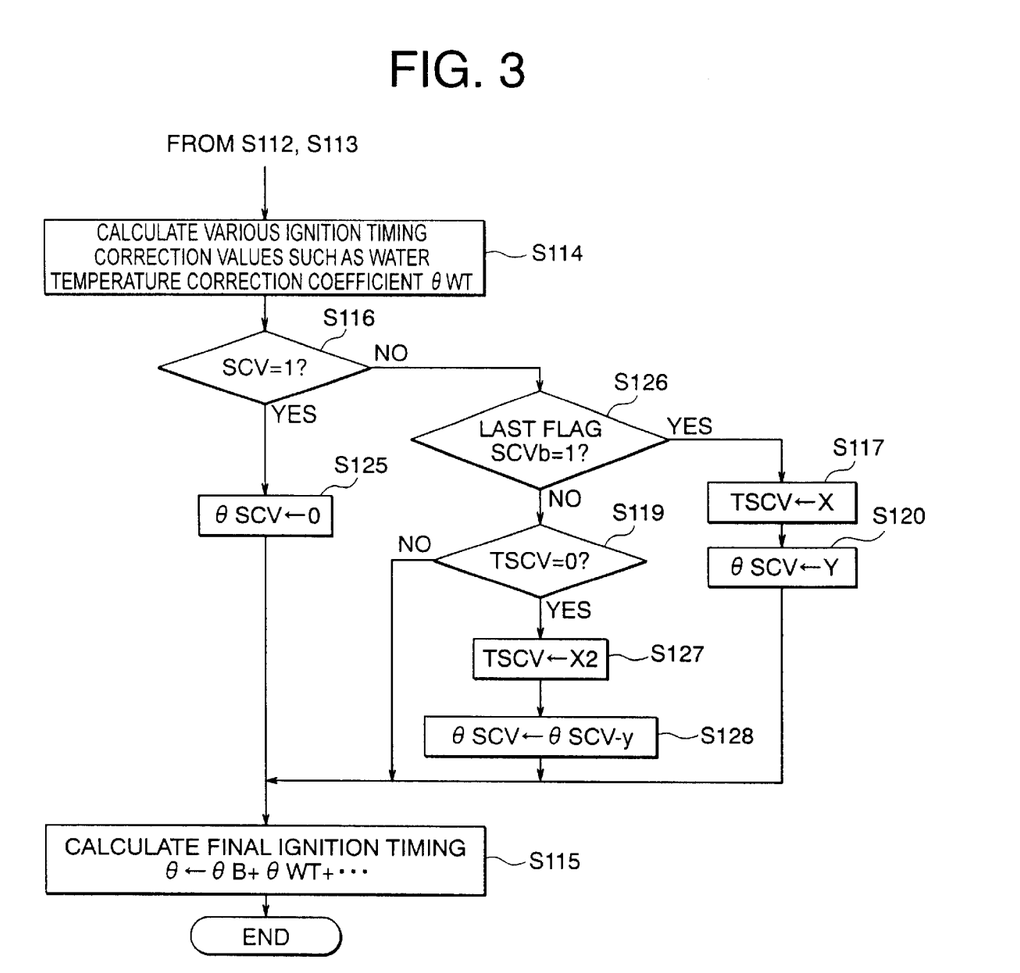
FIG. 3 is a flow chart illustrating the operation of an ignition timing control apparatus for an internal combustion engine according to a third embodiment of the present invention.

FIG. 3 is a flow chart illustrating the processing operation of the third embodiment of the present invention. In FIG. 3, the same or similar processing steps in this embodiment as those in the above-mentioned flow charts of FIGS. 1 and 2 are identified by the same symbols while omitting a detailed explanation thereof.

In FIG. 3, what is different from the flow chart of FIG. 6 is that processing in steps S125–S128 as well as the above-mentioned steps S116, S117, S119 and S120 is added between step S114 and step S115.

First, subsequent to step S114, a determination is made as to whether the valve closing flag SCV is set to "1" (step S116), and when it is determined as SCV=1 (i.e., YES), the prescribed retarded angle amount θSCV is initially set to "0" (step S125), and the control process proceeds to step S115.

When it is determined as SCV=0 (i.e., NO) in step S116, then a determination is made as to whether the last valve closing flag SCVb was set to "1", in order to determine whether it is immediately after the intake air control valve 23 has been changed from the closed state into the open state (step S126).

In step S126, when it is determined as SCVb =1 (i.e., YES), it is found to be immediately after the intake air control valve 23 has been changed from the closed state into the open state. Therefore, the predetermined period X is initially set in the timer TSCV (step S117), and the prescribed retarded angle amount θSCV is also initially set to Y (step S120).

On the other hand, when it is determined as SCVb =0 (i.e., NO) in step S126, it is found that the open state of the intake air control valve 23 continues, and hence it is further determined whether the value of the timer TSCV has reached "0" (step S119).

In step S119, when it is predetermined as TSCV >0 (i.e., NO), the predetermined period X has not yet elapsed and hence the control process immediately advances to the calculation processing of the final ignition timing θ (step S115).

On the other hand, when it is determined as TSCV=0 (i.e., YES) in step S119, it is found that the predetermined period X has elapsed after the intake air control valve 23 is driven to open. Thus, a second predetermined period X2 (hereinafter simply referred to as "predetermined period X2") is set in the timer TSCV (step S127), and the prescribed retarded angle amount θSCV is subtracted by a constant value y and thus updated to a value (=θSCV−y) (step S128). Thereafter, the control process proceeds to step S115.

Here, note that the predetermined period X2 set in step S127 may be a period equal to the predetermined period X or a period different from the predetermined period X. In addition, the value of the prescribed retarded angle amount θSCV subtracted by the constant value y in step S128 is clipped by a lower limit of "0".

In this manner, the prescribed retarded angle amount θSCV (=Y) is set over the predetermined period X immediately after the valve closing flag SCV has been changed from "1" into "0" (i.e., the intake air control valve 23 has been changed from the closed state into the open state), and then the prescribed retarded angle amount θSCV thus set is periodically subtracted by the constant value y at intervals of the predetermined period X2 after a lapse of the predetermined period X.

As a consequence, it is possible to avoid a rapid return of the final ignition timing θ to the advanced angle side, thus suppressing torque shock in addition to achieving the above-mentioned effects.

Embodiment 4

Although the processing in steps S100–S114 in the above-mentioned first embodiment is the same as in the flow chart of FIG. 6, the ignition timing map data may instead be subjected to interpolation processing according to the opening rate of the intake air control valve 23 while taking into consideration an intermediate valve opening rate of the intake air control valve 23.

Figure 4:
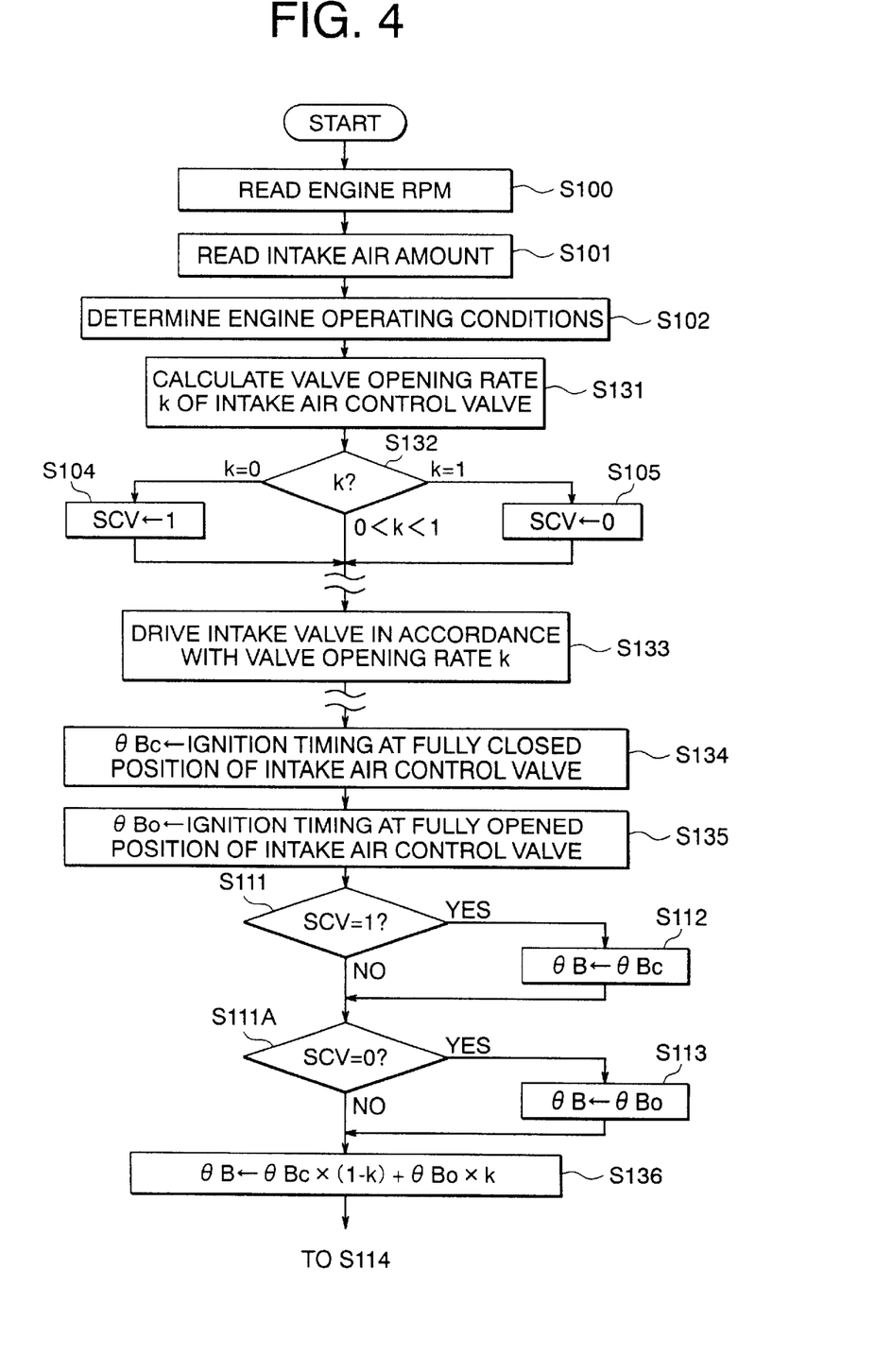
FIG. 4 is a flow chart illustrating the operation of an ignition timing control apparatus for an internal combustion engine according to a fourth embodiment of the present invention.

Now, reference will be made below to a fourth embodiment of the present invention, in which the ignition timing map data is interpolated according to the opening rate of the intake air control valve 23, while referring to FIG. 4. FIG. 4 is a flow chart illustrating the processing operation of the fourth embodiment of the present invention. In FIG. 4, the same or similar processing steps in this embodiment as those in the above-mentioned flow charts of FIGS. 1 and 6 are identified by the same symbols while omitting a detailed explanation thereof.

In this embodiment, the ECU 10 (see FIG. 5) includes, in addition to the above-mentioned functions, a valve opening rate calculating element for calculating the valve opening rate k of the intake air control valve 23, and an ignition timing interpolating element for interpolating the ignition timing map data θBo at an open state of the intake air control valve 23 and the ignition timing map data θBc at the closed state of the intake air control valve 23 according to the valve opening rate thereof when the intake air control valve 23 takes an intermediate opening.

In FIG. 4, what is different from FIG. 6 is that processing in steps S131–S136 is inserted in place of the above-mentioned steps S103 and S106–S110. In addition, steps S111, S111A, S112 and S113 (see FIG. 6) are inserted between steps S135 and S136.

Here, note that steps S134 and S135 in FIG. 4 correspond to steps S109 and S109, respectively, in FIG. 6. Also, the processing in step S114 and below is the same as shown in FIG. 1.

In FIG. 4, the ECU 10 reads the number of revolutions per unit time of the engine (step S100), further reads the intake air amount (step S101), and executes a determination of the engine operating conditions and a determination of the operating condition of the intake air control valve 23 in accordance with the engine operating conditions (step S102).

That is, the valve opening rate k ($0 \leq k \leq 1$) of the intake air control valve 23 is calculated based on the engine operating conditions (step S131), and the value of the valve opening rate k is determined (step S132).

In step S132, when it is determined as k=0, the valve closing flag SCV is set to "1" (step S104); when it is determined as k=1, the valve closing flag SCV is cleared to "0"; and when it is determined as $0 \leq k \leq 1$, the last value of the valve closing flag SCV is retained (step S105).

Then, the intake air control valve 23 is driven so that the actual opening rate thereof is made equal to the valve opening rate k (step S133), and the ignition timing θBc at the fully closed state of the intake air control valve 23 is stored (step S134), and the ignition timing θBo at the fully opened state of the intake air control valve 23 is also stored (step S135).

Subsequently, the value of the basic ignition timing θB is calculated by using the valve opening rate k and the ignition timings θBc and θBo calculated in steps S131, S134 and S135, respectively (step S136), and the control process proceeds to the various correction values calculation processing (step S114) and the following processing (see FIG. 1).

In step S136, the basic ignition timing θB is set according to the valve opening rate k in the following manner. Specifically, when it is found from the above-mentioned steps S111–S113 and S111 (see FIG. 6) that SCV=1 (the valve opening rate k is zero (fully closed): k=0), the ignition timing θBc at the fully closed state of the intake air control valve 23 becomes the basic ignition timing θB, whereas when found to be SCV=0 (the valve opening rate k is "1" (fully opened): k=1), the ignition timing θBo at the fully opened state of the intake air control valve 23 becomes the basic ignition timing θB.

Also, when the valve opening rate k is found to be an intermediate opening (0<k<1), the basic ignition timing θB is calculated through interpolation as a value between the ignition timing θBc at the fully closed state of the intake air control valve 23 and the ignition timing θBo at the fully opened state of the intake air control valve 23 according to the valve opening rate k, as expressed by the following equation (1).

$$\theta B = \theta Bc \times (1-k) + \theta Bo \times k \quad (1)$$

Then, various correction values are calculated as described above (step S114), and the final ignition timing θ is calculated using the various correction values thus obtained, so that the unillustrated ignition coil is energized to drive the spark plug 22 to spark at the final ignition timing θ.

Thus, by providing the ignition timing map data setting element (steps S134 and S135) for setting the ignition timing map data in accordance with the opening and closing condition of the intake air control valve 23, and the ignition timing calculating element (step S136) for interpolating between the respective ignition timing map data values according to the valve opening rate k when the intake air control valve 23 takes an intermediate opening, it is possible to achieve, in addition to the above-mentioned effects, accurate ignition timing control even in the event the intake air control valve 23 takes an intermediate valve opening rate.

While the invention has been described in terms of preferred embodiments, those skilled in the art will recognize that the invention can be practiced with modifications within the spirit and scope of the appended claims.

What is claimed is:

1. An ignition timing control apparatus for an internal combustion engine, comprising:

an engine operating condition detecting element for detecting operating conditions of said engine;

an intake air control valve provided in an intake passage of said engine;

a swirl control element for controlling the opening and closing of said intake air control valve in accordance with said engine operating conditions detected by said engine operating condition detecting element thereby to adjust a magnitude of a swirl of intake air sucked into said engine;

an ignition timing calculating element for determining ignition timing of said engine through interpolation using ignition timing map data corresponding to the number of revolutions per unit time of said engine and an engine load;

a map data setting element for switching and setting said ignition timing map data in accordance with opening and closing of said intake air control valve; and an ignition timing retarding element for correcting said ignition timing by a prescribed retarded angle amount over a first predetermined period after a switching of said ignition timing map data.

2. The ignition timing control apparatus for an internal combustion engine according to claim 1, wherein when said intake air control valve is changed from its closed state into its open state, said prescribed retarded angle amount is limited in a manner such that retarded ignition timing, which is obtained by subtracting said prescribed retarded angle amount from said ignition timing map data at an open state of said intake air control valve, becomes at an ignition timing advanced side from said ignition timing map data at a closed state of said intake air control valve.

3. The ignition timing control apparatus for an internal combustion engine according to claim 1, wherein said prescribed retarded angle amount is periodically subtracted to zero by a constant value at intervals of a second predetermined period after a lapse of said first predetermined period.

4. The ignition timing control apparatus for an internal combustion engine according to claim 1, further comprising:

a valve opening rate calculating element for calculating a valve opening rate of said intake air control valve; and an ignition timing interpolating element for interpolating said ignition timing map data at an open state of said intake air control valve and said ignition timing map data at a closed state of said intake air control valve in accordance with said valve opening rate when said intake air control valve takes an intermediate opening.

* * * * *